UNITED STATES PATENT OFFICE.

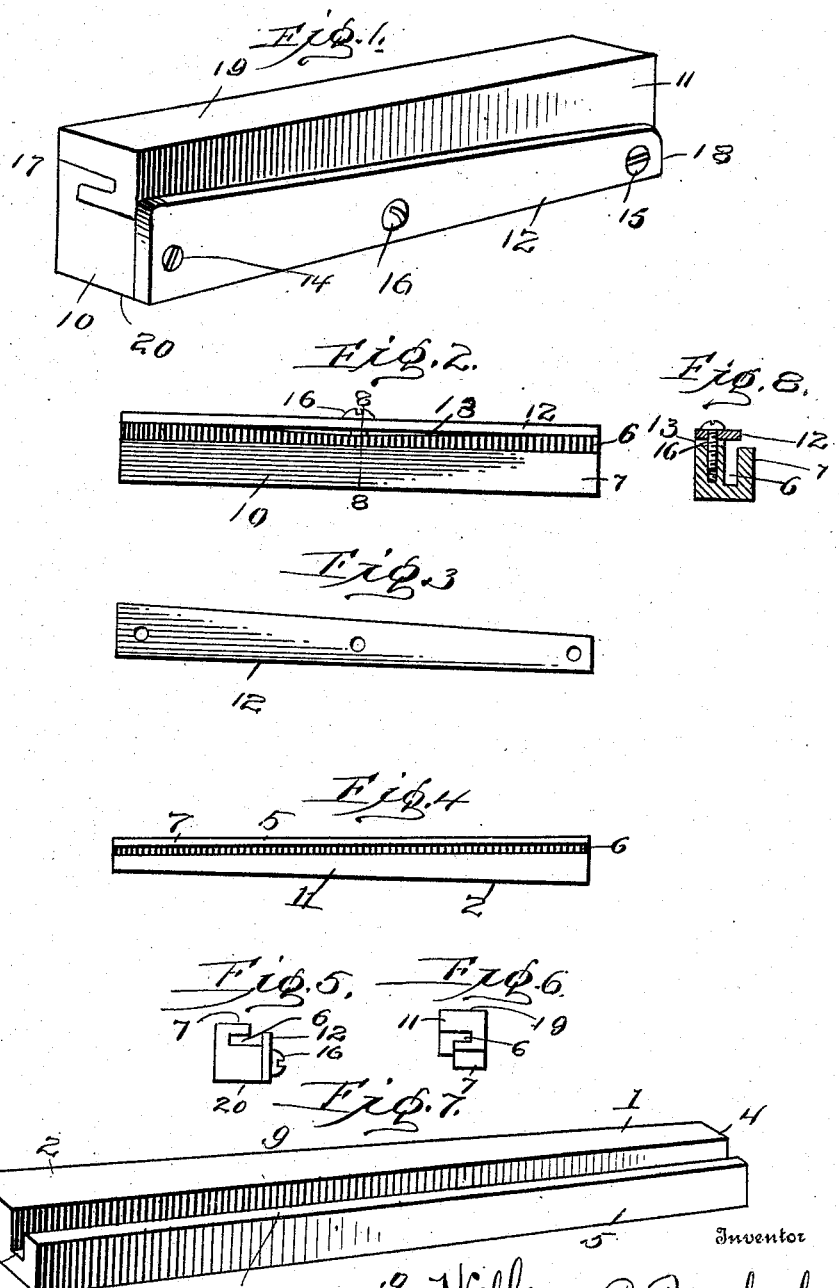

WILLIAM B. RUNBECK, OF WASHINGTON, DISTRICT OF COLUMBIA.

PARALLEL STRIP.

No. 910,959.      Specification of Letters Patent.      Patented Jan. 26, 1909.

Application filed November 7, 1907. Serial No. 401,151.

*To all whom it may concern:*

Be it known that I, WILLIAM B. RUNBECK, a citizen of the United States, residing at Washington, District of Columbia, have invented certain new and useful Improvements in Parallel Strips; and I do hereby declare the following to be a full, clear, and exact description of the invention, such as will enable others skilled in the art to which it appertains to make and use the same.

This invention relates to improvements in parallel strips and comprises the provision of a plurality of beveled members interlocked for holding same together to permit the longitudinal movement of each member.

The invention further comprises the provision of a spacing device formed of a plurality of parts having a beveled surface along one edge and a straight surface along the other for providing a structure that when brought in the same horizontal plane have their outer edges extended to the farthest extent for spreading or spacing the parts of any desired object or for clamping in position any object.

The invention still further comprises a spreading device or parallel strip formed with beveled surfaces and grooves designed to interlock for holding the various parts of the parallel strip in correct relation to each other, together with a clamping means for locking the parallel strip together.

The object in view is the provision of a parallel strip which may be formed of a plurality of parts, each part having a beveled edge and a longitudinal groove, the groove in each part interlocking, and means for guiding and also clamping the parts together.

With these and other objects in view the invention comprises certain novel constructions, combinations, and arrangement of parts that will be hereinafter more fully described and claimed.

In the accompanying drawing: Figure 1 is a perspective view of my invention shown in a closed position. Fig. 2 is a top plan view of one-half of my parallel strip, a curved portion thereof being shown exaggerated for more clearly showing the structure. Fig. 3 is a plan view of a clamping member forming part of the present invention. Fig. 4 is an edge view of one of the members forming part of the present invention. Fig. 5 is an end view of Fig. 2. Fig. 6 is an end view of Fig. 4, looking at the small end thereof. Fig. 7 is a perspective view of a blank which is designed to be cut in half for forming the two spreading members of the present invention. Fig. 8 is a section through Fig. 2 on line 8—8.

In the present invention it is designed to provide a spacing or clamping bar or parallel strip for spacing or supporting in position any object or article desired to be operated upon, a milling machine, plane, or the like, or may be used to support in position any desired article. Constructing the present invention I form the spreading members preferably out of one piece of material as shown in Fig. 7 of the drawing.

Referring more particularly to the drawing, 1 indicates a blank that has been properly milled and is twice the length of the parallel strip forming the present invention. In constructing this blank the same is machined until it is perfectly level and true so that edge 2 will be at right-angles to the ends 3 and 4. Edge 5 however will be at an angle to the ends 3 and 4, the end 4 being much smaller or narrower than end 3. This will give a substantial bevel to surface or edge 5 in relation to edge 2 as clearly seen in Fig. 4. After the sides and ends have been properly shaped a groove or way 6 is provided along the beveled edge of the blank. In providing the groove the same may be sawed or simply milled and it is designed to be milled to such a depth that the distance from the bottom of the groove to the bottom of the blank is the same as from the top of the blank to the top edge of a flange 7 formed by reason of the groove. This will permit easy fit when the blank is sawed or cut approximately in the center thereof, for instance on line 9—9. After the blank has been cut in half the respective ends may be telescoped or fitted into each other, the flange 7 of one part fitting into the groove 6 of the other part. By reason of the depth of the groove 6 and the height of the flange 7 the respective parts when fitted together will have their upper surfaces on the same plane and also their lower surfaces.

One of the parts of the blank after the blank has been severed, forms what may be termed part 10, the remaining part will be part 11, each one fitted together as seen in Fig. 7 forms the complete article, a guiding and clamping member 12 being used in connection therewith. Part 10 is designed to be machined or filed off slightly in the center thereof at 13 for forming a depressed portion. The depressed portion 13 does not extend the entire length of part 10 but falls short of the ends thereof. Clamping member 12 is secured to the end of part 10 by screws 14 and 15 that preferably are counter-sunk and have their heads machined off so as to be flush with the upper surface of the clamping member. A clamping bolt or screw 16 is positioned substantially centrally of member 12 and passes through member 12 into part 10 and is screw-threaded therein as clearly seen in Fig. 8. This is arranged so that when desired bolt or screw 16 may be tightened and cause clamping member 12 to press against part 11 when the same is in position. This will entirely prevent any longitudinal movement of part 11 or simply dampen the movement thereof.
It will of course be evident that part 10 may be constructed as clearly seen in Fig. 7, and then part 11 construcetd in a similar manner except that the same will be constructed left-handed. The two parts are then fitted together and cut in half if desired for making two tools or may be left their original size for making one large tool. After the parts have been thus fitted together the depressed portion 13 is formed and the spring is placed in position. By this means a structure or tool is quickly and easily provided and one that is very strong and durable and quickly and easily accomplishing the objects for which it is constructed. The groove 6 and flange 7 of each member also forms an important feature of the invention in that the same will so interlock as to positively prevent any motion except the longitudinal movement, and the longitudinal movement is regulated by clamping and guiding member 13 which is not only used to clamp and prevent longitudinal movement of parts 10 and 11 but also is designed to prevent any lateral movement of part 11 after the same has been placed in position as shown in Fig. 1.

In use or operation the members 10 and 11 are moved from the position shown in Fig. 7 until their small ends 17 and 18 respectively are near to each other. This will cause the upper surface 19 of member 11 and the lower surface 20 of member 10 to come nearer to each other. The tool is then placed in position against or in proximity to the device desired to be held and then either member 10 or 11 or both are moved to the position shown in Fig. 1, or if desired the members 10 and 11 may be moved so that the large end of one part will be near the large end of the other part. This will, as will be evident, spread or move apart the top surface 19 and the bottom surface 20 and consequently press against the article being held for firmly holding the same in position. The clamping member 13 is then caused to grip or clamp member 11 by reason of the tightening of the bolt or screw 13. This will prevent any longitudinal movement of either of the parts 10 or 11 so that the same are held from accidental movement and consequent releasing while the article is being held.

What I claim is:

1. In a machinist's tool, a parallel strip formed of interlocking members, each of said interlocking members being provided with a beveled surface, and a groove extending longitudinally of the member at an angle to the beveled surface, and a clamping bar secured to one of said members and engaging the other of said members for preventing longitudinal movement of both members, and means for regulating the tension of said clamping bar.

2. In a machinist's tool, a parallel strip formed of interlocking members, each of said interlocking members being formed with a beveled surface in opposition to the other, and one of said members being formed with a depressed portion, a spring clamping member secured to one of said members and extending above said depressed portion, and means for forcing said spring member into said depressed portion for clamping said members together.

3. In a machinist's tool, a parallel strip formed of a plurality of parts, each part having a beveled surface, the beveled surfaces being adapted to contact for permitting the outer edges of the parts to present parallel surfaces and to permit the variation of the distance between said parallel surfaces, a flange and groove on each of said parts, the flange of one part being adapted to engage the groove of the other part, one of said parts being formed with a depressed portion centrally, a spring member secured to the part having the depressed portion, and means for forcing said spring member into said depressed portion for clamping said parts together.

4. In a machinist's tool, a parallel strip formed of a plurality of parts, each part having a beveled surface, the beveled surfaces being designed to contact for permitting the outer edges of the parts to be varied in their distance from each other, and means for holding said parts together, said means comprising a spring plate secured to one of said parts at its ends, and a tension screw for pressing the center of said spring toward said members for clamping the same together.

5. In a machinist's tool, a parallel strip formed of interlocking members, each of said members being provided with a beveled surface, one face of one of the members being of irregular contour, and a clamping bar secured to the said face of the said member and adapted to be sprung to conform to the contour of the said face of the said member to exert a clamping action against the other member and thereby hold the members against relative movement.

In testimony whereof I affix my signature in presence of two witnesses.

WILLIAM B. RUNBECK.

Witnesses:
  A. S. KITCHIN,
  ROBINSON WHITE.